United States Patent
Mummadi et al.

(10) Patent No.: US 12,243,283 B2
(45) Date of Patent: Mar. 4, 2025

(54) DEVICE AND METHOD FOR DETERMINING A SEMANTIC SEGMENTATION AND/OR AN INSTANCE SEGMENTATION OF AN IMAGE

(71) Applicant: Robert Bosch GmbH, Stuttgart (DE)

(72) Inventors: Chaithanya Kumar Mummadi, Pittsburgh, PA (US); Jan Hendrik Metzen, Boeblingen (DE); Robin Hutmacher, Renningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 370 days.

(21) Appl. No.: 17/894,358

(22) Filed: Aug. 24, 2022

(65) Prior Publication Data

US 2023/0101810 A1 Mar. 30, 2023

(30) Foreign Application Priority Data

Sep. 22, 2021 (EP) .................................... 21198202

(51) Int. Cl.
*G06V 10/26* (2022.01)
*G06V 10/764* (2022.01)
(Continued)

(52) U.S. Cl.
CPC ............ *G06V 10/26* (2022.01); *G06V 10/764* (2022.01); *G06V 10/7715* (2022.01); *G06V 10/82* (2022.01)

(58) Field of Classification Search
CPC .. G06V 10/26; G06V 10/764; G06V 10/7715; G06V 10/82; G06T 7/10;
(Continued)

(56) References Cited

U.S. PATENT DOCUMENTS 8,879,813 B1 * 11/2014 Solanki ................... G06T 3/14
382/128
10,467,500 B1 * 11/2019 Bao .......................... G06T 9/002
(Continued)

FOREIGN PATENT DOCUMENTS

EP 3869387 A1 * 8/2021 ............. G06F 18/24
EP 3879461 A1 * 9/2021 ............... G06N 3/04
(Continued)

OTHER PUBLICATIONS

Mummadi et al., "Test-Time Adaptation To Distribution Shift By Confidence Maximization and Input Transformation," Cornell University, 2021, pp. 1-16.
(Continued)

*Primary Examiner* — Mahendra R Patel
(74) *Attorney, Agent, or Firm* — NORTON ROSE FULBRIGHT US LLP; Gerard A. Messina

(57) ABSTRACT

A computer-implemented method for determining an output signal characterizing a semantic segmentation and/or an instance segmentation of an image. The method includes: determining a first intermediate output signal from a machine learning system, wherein the first intermediate output signal characterizes a semantic segmentation and/or an instance segmentation of the image; adapting parameters of the machine learning system based on a loss function, wherein the loss function characterizes an entropy or a cross-entropy of the first intermediate output signal; determining the output signal from the machine learning system based on the image and the adapted parameters.

12 Claims, 5 Drawing Sheets

(51) Int. Cl.
*G06V 10/77* (2022.01)
*G06V 10/82* (2022.01)

(58) Field of Classification Search
CPC ... G06T 5/20; G06T 5/70; G06T 2207/20081; G06T 2207/20084; G06T 2207/20182; G06N 3/08
USPC .......................................................... 382/157
See application file for complete search history.

(56) References Cited

U.S. PATENT DOCUMENTS

| | | | |
|---|---|---|---|
| 10,685,446 B2 * | 6/2020 | Fleishman | H04N 13/261 |
| 10,783,622 B2 * | 9/2020 | Wang | G06N 3/047 |
| 11,074,504 B2 * | 7/2021 | Chen | G06T 7/187 |
| 11,163,989 B2 * | 11/2021 | Sun | G06V 10/809 |
| 11,958,529 B2 * | 4/2024 | Mandlekar | G06N 3/088 |
| 12,051,261 B2 * | 7/2024 | Rejeb Sfar | G06V 30/422 |
| 12,094,124 B2 * | 9/2024 | Guo | G06F 18/2431 |
| 12,106,828 B2 * | 10/2024 | Kostem | G06V 10/507 |
| 2008/0292194 A1 * | 11/2008 | Schmidt | G06T 7/0012 |
| | | | 382/131 |
| 2017/0262735 A1 * | 9/2017 | Ros Sanchez | G06T 7/10 |
| 2020/0027002 A1 * | 1/2020 | Hickson | G06N 3/088 |
| 2021/0035304 A1 * | 2/2021 | Jie | G06N 3/084 |
| 2021/0241034 A1 * | 8/2021 | Laradji | G06N 3/08 |
| 2021/0319315 A1 * | 10/2021 | Hutmacher | G05B 13/027 |
| 2021/0407090 A1 * | 12/2021 | Li | G06F 18/24 |
| 2022/0092368 A1 * | 3/2022 | Hao | G06N 7/01 |
| 2022/0375211 A1 * | 11/2022 | Tolstikhin | G06V 10/454 |
| 2023/0107917 A1 * | 4/2023 | Pabbaraju | G06T 7/10 |
| | | | 382/156 |
| 2023/0186622 A1 * | 6/2023 | Laszlo | G06N 3/045 |
| | | | 382/103 |

FOREIGN PATENT DOCUMENTS

| | | | | |
|---|---|---|---|---|
| WO | WO-2020049087 A1 * | 3/2020 | | G05B 23/024 |
| WO | WO-2020237215 A1 * | 11/2020 | | G06F 18/2155 |
| WO | WO-2022023646 A1 * | 2/2022 | | G06N 3/045 |
| WO | WO-2022037170 A1 * | 2/2022 | | G06K 9/6277 |

OTHER PUBLICATIONS

Wittich, "Deep Domain Adaptation by Weighted Entropy Minimization for the Classification of Aerial Images," ISPRS Annals of the Photogrammetry, Remote Sensing and Spatial Information Sciences, vol. V—Feb. 2020, XXIV ISPRS Congress, 2020, pp. 591-598.

Vu et al., "Advent: Adversarial Entropy Minimization for Domain Adaptation in Semantic Segmentation," IEEE/CVF Conference on Computer Vision and Pattern Recognition (CVPR), 2019, pp. 2512-2521.

Wang et al., "Tent: Fully Test-Time Adaptation By Entropy Minimization," Cornell University, 2021, pp. 1-15.

* cited by examiner

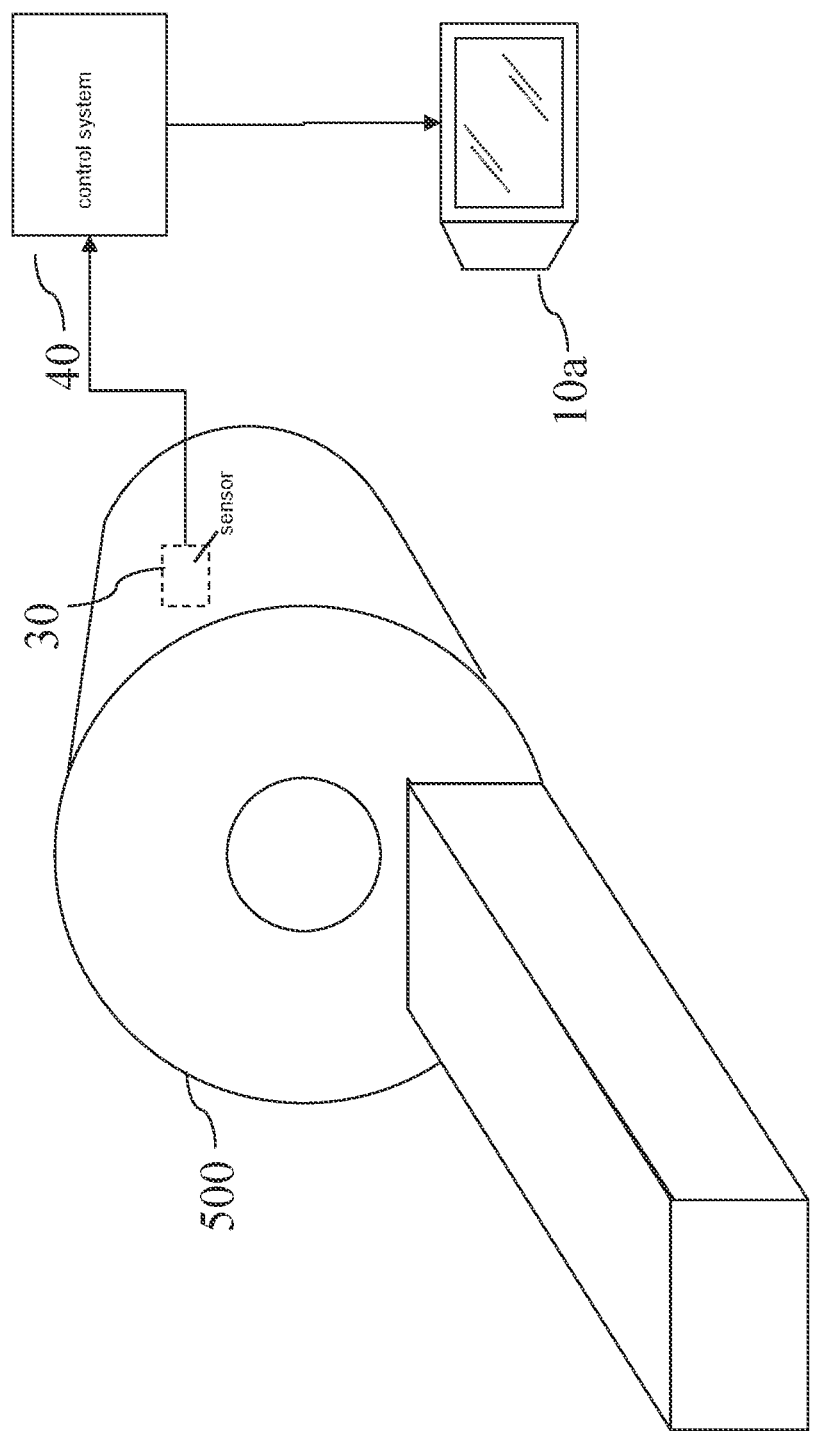

DEVICE AND METHOD FOR DETERMINING A SEMANTIC SEGMENTATION AND/OR AN INSTANCE SEGMENTATION OF AN IMAGE

CROSS REFERENCE

The present application claims the benefit under 35 U.S.C. § 119 of European Patent Application No. EP 21 19 8202.0 filed on Sep. 22, 2021, which is expressly incorporated herein by reference in its entirety.

FIELD

The present invention concerns a method for determining an output signal by means of a machine learning system, a machine learning system, a control system for controlling an actuator, a computer program, and a machine-readable storage medium.

BACKGROUND INFORMATION

Mummadi et al. "Test-Time Adaptation to Distribution Shift by Confidence Maximization and Input Transformation", Jun. 28, 2021, available online: https://arxiv.org/pdf/2106.14999.pdf describes a method for test time adaption.

Machine learning (ML) system, especially neural networks, are used in an increasing number of technological fields, especially for analyzing sensor data from optical sensors.

When deploying ML systems, the data encountered after deployment might differ from the typical data used for training. In this case, there is a domain shift (also called distribution shift).

Since the performance, e.g., classification accuracy or accuracy of a continuous value determined in a regression, of ML systems can significantly deteriorate after a domain shift, it would be desirable to devise a method for adapting the ML system to a novel domain and/or distribution. Especially in situations when no reliable annotations for the novel domain and/or distribution are available during inference such an adaption method is desirable. A specific situation is "source-free domain adaptation" or "test-time adaptation", where the adaptation is done purely on unlabeled data from the target domain (the domain after the shift) without requiring data on which the network was trained originally (source domain).

SUMMARY

In a first aspect, the present invention concerns a computer-implemented method for determining an output signal (y) characterizing a semantic segmentation and/or an instance segmentation of an image. According to an example embodiment of the present invention, the method comprises the steps of:
  Determining a first intermediate output signal by means of a machine learning system, wherein the first intermediate output signal characterizes a semantic segmentation and/or an instance segmentation of the image;
  Adapting parameters of the machine learning system based on a loss function, wherein the loss function characterizes an entropy or a cross-entropy of the first intermediate output signal;
  Determining the output signal from the machine learning system based on the image and the adapted parameters.

The image may especially be obtained by a sensor, e.g., a camera, a LIDAR sensor, a radar sensor, an ultrasonic sensor, or a thermal camera. The image may, however, also be computer-generated, e.g., by a method for rendering a virtual scene in a computer or as generated by a machine learning model, e.g., a generative adversarial network.

The image is processed by the machine learning system. In other words, the machine learning system takes the image as input. The machine learning system may preferably be a neural network configured for determining the intermediate signal. Alternatively, the machine learning system may comprise a machine learning model, e.g., a neural network for determining the first intermediate output, i.e., the machine learning model may be configured to execute the method for determining the output signal.

Whether comprised in the machine learning model or being the machine learning model, the neural network may especially be a convolutional neural network, a visual transformer, or a vision transformer.

The method is especially suitable to be run at inference time of the machine learning system. Inference time may also be referred to as "after deployment" or "after training" of the machine learning system. The first intermediate output signal may be modified by the method to advantageously adapt the machine learning system from its training data to the image, i.e., the data the machine learning system experiences during inference. The inventors found that this adaption leads to an increase in prediction performance of the machine learning system. In the context of semantic segmentation or instance segmentation, a prediction performance may commonly be determined based on a metric known as mean intersection over union, also known as mIOU.

The method may also be understood as a method for test time adaption. Test time adaption may be especially feasible if a domain from which the training dataset originates differs from a domain from which the image originates.

According to an example embodiment of the present invention, the semantic segmentation and/or instance segmentation may especially assign classifications to pixels of the image. The classifications may be given in the form of an index of a class a respective pixel is classified into. Preferably, the classifications as given as a vector of probabilities for a plurality of classes. This is also known as soft classifications. A semantic segmentation or an instance segmentation may also be referred to as a label map.

The semantic segmentation and/or instance segmentation may especially be given in the form of a tensor respectively. A respective tensor may especially be a three-dimensional tensor. Preferably, a first dimension and a second dimension of the tensor characterizes respectively a height and a width of the semantic segmentation or instance segmentation while a third dimension of the tensor characterizes the plurality of classes. This may also be understood as the tensor comprising a plurality of classifications, wherein the classifications are indexed along the width and height dimension. Preferably, the tensor contains as many elements along the width and height dimension as does the image along its width and height respectively. A classification may hence be understood as corresponding to a pixel, i.e., a classification located at height i and width j may characterize a pixel of the image at height i and width j. The term "classification at position i,j" my hence be understood as the classification being located at height i and width j.

The first intermediate output signal may be understood as characterizing a semantic segmentation and/or instance segmentation as can be put out by the machine learning system if no adaption takes place. For adapting the machine learning system to the image, the method may be understood as determining adapted, i.e., new parameters of the machine learning system. The machine learning system then determines an output for the image using the new parameters, which have been adapted to the image. In other words, the output signal is determined like the first intermediate output signal albeit based on the new parameters of the machine learning system.

According to an example embodiment of the present invention, the semantic segmentation and/or instance segmentation may also characterize a classification part of an object detection. For example, common machine learning systems for single shot object detection (also known as single shot detection or SSD) split the task of object detection into sub tasks. A first sub-task may be classifying whether a pixel of an image characterizes the presence of an object or a specific part of an object, a second sub-task may be to determine an exact location of the object, and a third sub-task may be to determine an extend of the object, e.g., width and height. This approach is followed for common object detectors like CenterNet. The method is hence also applicable for object detection tasks, at least for solving the subtask of classifying the presence of an object as this is essentially a semantic segmentation task. Please note that CenterNet-like approaches do not determine a classification for every pixel but for a patch of pixels in the image, e.g., a 4×4 patch. It is, however, still possible to use the method proposed here as each pixel may still be understood to correspond to a classification albeit the classification being shared with other pixels.

According to an example embodiment of the present invention, determining the new parameters may especially be achieved by means of a gradient descent algorithm, especially if the machine learning system is or comprises a neural network. The authors found that adapting the parameters of the machine learning system may advantageously be achieved based on a single image, i.e., the image only. This is an advantage over conventional methods, which require a plurality of images, i.e., a batch of images for adapting as the machine learning system would otherwise overfit to the image. The inventors found that, due to the characteristic of performing a semantic segmentation, the machine learning system is given a plurality of classifications to be used in gradient descent, which allows for using a single image for adapting the parameters while not overfitting to the image.

The method may also be executed for a sequence of images, e.g., a video. In this case, the method may be executed for each image individually, i.e., iteratively. In each iteration, the parameters determined in a previous iteration may be used as starting point for finding new parameters of the machine learning system based on the image in the iteration. Alternatively, it is also possible to use the parameters determined when training the machine learning system on its training dataset, i.e., reset the parameters at the start of each iteration.

Preferably, the loss function characterizes a mean entropy of classifications obtained for pixels of the image.

In other words, the loss function may characterize an entropy determined for each classification characterized by a semantic segmentation and/or instance segmentation characterized by the first output signal, wherein the entropies may then be averaged in order to determine an entropy of the semantic segmentation or instance segmentation.

The loss function may, for example be the negative of the mean of respective Shannon entropies determined for each classification characterized by the semantic segmentation and/or instance segmentation characterized by the first intermediate output signal. Preferably, the negative of the mean of the respective Shannon entropies is a term among a plurality of terms, wherein the loss function is or is characterized by a sum of the terms.

It is also possible that the loss function characterizes a cross-entropy between the first intermediate output signal and a second intermediate output signal. Preferably, the second intermediate output signal is determined based on the first intermediate output signal and by means of a transformation function, wherein the second intermediate output signal characterizes a semantic segmentation and/or an instance segmentation of the image. For example, the first intermediate output signal may be the output of a machine learning model, e.g., a neural network, wherein the transformation function processes the determined first intermediate output signal to determine the second intermediate output signal. The transformation function may also be part of the machine learning model, e.g., it may be a layer of the neural network, wherein the output of the layer is the second intermediate output signal and an input to the layer is the first intermediate output layer.

In the following the term "a classification in the first intermediate output signal" may be understood as a classification characterized by the semantic segmentation and/or instance segmentation characterized by the first intermediate output signal. Likewise, the term "a classification in the second intermediate output signal" may be understood as a classification characterized by the semantic segmentation and/or instance segmentation characterized by the second intermediate output signal.

The cross-entropy between the first intermediate output signal and the second intermediate output signal may be determined similar to the entropy: Each classification in first intermediate output signal has a corresponding classification in the second intermediate output signal, namely the classification in the second intermediate input signal that has a same position in the second intermediate output signal as does the classification in the first intermediate output signal. A cross-entropy may then be determined for each pair of classification in the first intermediate output signal and corresponding classification in the second intermediate output signal, preferably for all pairs. Instead of the cross-entropy, the loss term may also comprise a hard likelihood ratio or a soft likelihood ratio of the corresponding classifications.

The transformation function may be defined a priori. For example, the transformation function may characterize an edge-preserving smoothing filter, especially a bilateral filter. The inventors found that this type of filtering advantageously removes misclassifications in the semantic segmentation or instance segmentation characterized by the first intermediate output signal and thereby increases the performance of the machine learning system even further.

Alternatively, the transformation function may be a trainable function, e.g., a layer of a neural network as disclosed above.

Additionally, the loss function may further characterize a likelihood, preferably a log-likelihood, of at least a part of the first intermediate output signal, wherein the likelihood is determined based on a density model of the at least part of the image.

According to an example embodiment of the present invention, the density model may especially characterize a maximum likelihood estimate of classifications from semantic segmentations and/or instance segmentations from a dataset, preferably a training dataset of the machine learning system. This way, the machine learning system is able to adapt its output while still providing an output signal characterizing a semantic segmentation and/or instance segmentation that is plausible with respect to known semantic segmentations and/or instance segmentations. In other words, the output characterizes a semantic segmentation and/or instance segmentation that is more consistent with semantic segmentations and/or instance segmentations from the dataset. The inventors found that this advantageously increases the performance of the machine learning system even further.

The density model may model an overall occurrence of classes. For example, the model may be determined by first creating respective class histograms of semantic segmentations and/or instance segmentations comprised in the dataset. The histograms could then be used to fit the density model, e.g., by a maximum likelihood method. The density model may be characterized by a multinomial model, a Gaussian model, or a mixture model such as a Gaussian mixture model or a multinomial mixture model. The histograms may also be normalized, e.g., L1-normalized before being used for fitting the density model.

According to an example embodiment of the present invention, instead of characterizing the classifications of the entire first intermediate output signal, the likelihood characterized by the loss function may also characterize an average likelihood of a plurality of patches, wherein the plurality of patches is determined based on the first intermediate output signal.

A patch may be understood as a rectangular region of the first intermediate output signal along a width and height dimension. A patch may hence characterize a subset of classifications comprised in the first intermediate output signal. For semantic segmentations and/or instance segmentations of the dataset, patches of a same size may be extracted and used for fitting the density model, which can again be a multinomial model, a Gaussian model or a mixture model. During adaption, patches may then be extracted from the first intermediate output signal and a likelihood may be determined for each extracted patch. The extraction of the patches may especially be random, e.g., the locations at which patches are extracted may be determined at random. For each patch, a likelihood may then be determined form the density model and the likelihoods determined this way may be averaged and used as term in the loss function.

The inventors found that using patches this way increases a performance of the machine learning system even further.

A likelihood for a patch may also be determined by determining a feature representation of the patch using a feature extractor and providing a likelihood of the feature representation as likelihood of the patch, wherein the likelihood of the feature representation is determined by the density model.

According to an example embodiment of the present invention, the feature extractor may especially be a neural network, e.g., a convolutional neural network. Preferably, parameters of the neural network are fixed when determining gradients for adapting parameters of the machine learning system. The feature extractor may hence be understood as having its parameters frozen. For determining the density model, patches may again be extracted from the semantic segmentations and/or instance segmentations of the dataset. Then respective feature representations may be determined for the extracted patches based on the feature extractor. The feature representations may then be used to fit the density model, e.g., using a maximum likelihood estimate method.

For adapting the machine learning system, patches may, again, be extracted at random and forwarded through the feature extractor. The resulting feature representations may then be provided to the density model, which in turns determines a plurality of likelihood or log-likelihood values. The likelihood or log-likelihood values may then be averaged to determine the likelihood value characterized by the loss function.

In all of the respective embodiments using information from semantic segmentations and/or instance segmentations from the dataset, the likelihood characterized by the loss function may especially be used in a loss term of the loss function, which is characterized by the formula:

$$l_{clf} = -\log p(x),$$

wherein p(·) is a likelihood of the density model for a first intermediate output signal or patch x.

When using patches, it is also possible to alter classifications comprised in the patches in order to show the machine learning system which combinations of classifications in a patch are not to be expected and should hence not be output in the output signal. For example, for each patch from a plurality of patches classifications may be swapped, e.g., the most common classification in the patch with a second most common classification in the patch, a third modest common classification in the patch with a fourth most common classification in the patch and so forth. The loss function may then comprise a term giving the machine learning system incentive to not put out output signals that look like these altered patches. The loss function may hence comprise a loss term characterized by the formula:

$$l_{clf} = \frac{1}{N}\sum_{i=1}^{N} -\log p(x_i) + \log p(x_i'),$$

wherein $x_i'$ is a patch obtained by altering a patch $x_i$ from a plurality of N patches.

Preferably, for determining the output signal, the machine learning system may comprise a normalization transformation and the loss may further characterize a Kullback-Leibler divergence between an output of the normalization transformation and a predefined probability distribution.

The term "for determining the output signal" may be understood in so far as the normalization transformation has a decisive influence when determining the output signal from the image. For example, if a neural network is used for determining the first intermediate output signal and/or the second intermediate output signal, a normalization layer of the neural network may be understood as the normalization transformation. The normalization layer may, e.g., be BatchNorm layer, a GroupNorm layer, or a LayerNorm layer.

According to an example embodiment of the present invention, the normalization transformation may especially normalize an input of the normalization transformation according to a predefined scheme. For example, in normalization layers, the input or parts of the input may be normalized such that the input or the parts have zero-mean and unit variance. For example in BatchNorm, the input may be a tensor characterizing a plurality of images in a batch used for training the machine learning system. The channels of the tensor may then be normalized such that each channel in the tensor has zero mean and unit variance with respect to all samples of the batch. For inference, the mean and variance for batches used in training may be averaged, e.g., by means of a running average. The normalization layer may also comprise other operations such as a scale and shift operation.

For the purpose of the method, however, the output as referred to in the loss characterizing a Kullback-Leibler divergence between an output of the normalization transformation and a predefined probability distribution may especially be considered an output of the layer after normalization and before the scale and shift operation.

The inventors found that it is beneficial for adaption to include the loss term characterizing the Kullback-Leibler divergence as this further increases the performance of the machine learning system.

Preferably, the predefined probability distribution is characterized by a standard normal distribution. The predefined probability distribution may also be a multivariate standard normal distribution, i.e., a multivariate normal distribution with a null vector as expected value and an identity matrix as covariance matrix.

The Kullback-Leibler divergence may, for example, be comprised in a term of the loss function, wherein the term of the loss may be characterized by the formula:

$$L_{adm}^\theta = D_{kl}[\mathcal{N}(\mu(h), \sigma^2(h)) \| \mathcal{N}(0,1)],$$

wherein $D_{kl}$ is the Kullback-Leibler divergence, h is the output after normalization, μ characterizes an expected value of the output, $\sigma^2$ characterizes a variance of the output, and $\mathcal{N}$ characterizes a potentially multivariate normal distribution. The output may be characterized by a tensor that is normalized along a dimension or along a plurality of dimensions. This means that not the entire tensor is normalized but only parts of it. In this case, for each part of the tensor that is normalized the Kullback-Leibler divergence may be determined according to the formula above and the term $L_{adm}^\theta$ may then be given by an average of the respective Kullback-Leibler divergences.

There may also exist multiple normalization transformations in the machine learning system, e.g., multiple normalization layers. The loss term may then be adapted to account for a plurality, preferably a such normalization transformations:

$$L_{adm}^\theta = \sum_{k=1}^{N} \lambda_k D_{kl}[\mathcal{N}(\mu(h^{(k)}), \sigma^2(h^{(k)})) \| \mathcal{N}(0,1)],$$

wherein N is the number of normalization transformations, $h^{(k)}$ the output of the k-th normalization transformation after normalization, and $\lambda_k$ a hyperparameter for scaling the Kullback-Leibler divergence corresponding to the k-th normalization transformation.

Embodiments of the present invention will be discussed with reference to the figures in more detail.

BRIEF DESCRIPTION OF THE DRAWINGS

FIG. 5 shows the control system controlling an imaging system, according to an example embodiment of the present invention.

DETAILED DESCRIPTION OF EXAMPLE EMBODIMENTS

Figure 1:
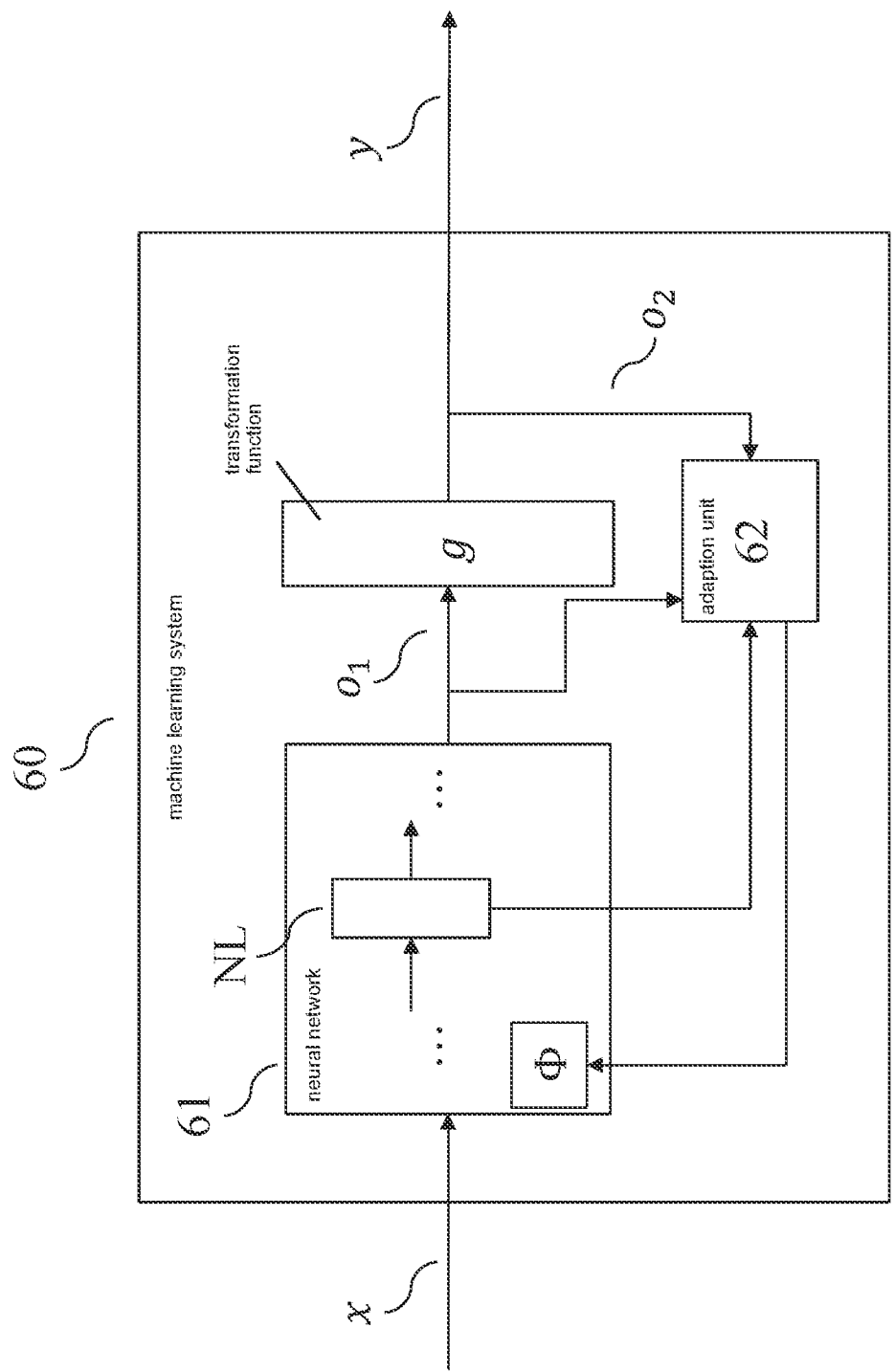
FIG. 1 shows a machine learning system, according to an example embodiment of the present invention.

FIG. 1 shows an embodiment of a machine learning system (60). The machine learning system (60) is configured to accept an image (x) as input. In the embodiment, the image (x) is forwarded to a neural network (61) of the machine learning system, wherein the neural network (61) is configured to determine a semantic segmentation and/or an instance segmentation for the image (x). The neural network may especially be a convolutional neural network, a vision transformer, or a visual transformer. In further embodiments (not shown), it is also possible to use another machine learning model instead of the neural network (61). The neural network comprises a plurality of parameters (Φ), e.g., weights, biases, or normalization parameters. Before being used, the neural network (61) may be trained to predict semantic segmentations and/or instance segmentations according to conventional methods.

The neural network (61) is configured to determine a first intermediate output signal ($\sigma_1$), wherein the first intermediate output signal ($\sigma_1$) characterizes a semantic segmentation and/or an instance segmentation of the image (x). The first intermediate output signal ($\sigma_1$) is forwarded to an adaption unit (62). Based on the first intermediate output signal ($\sigma_1$), the adaption unit (62) determines adapted parameters for the neural network (61). The neural network (61) then determines a new first intermediate output signal ($\sigma_1$) based on the image (x) and the adapted parameters. In further embodiments (not shown) the new first intermediate output signal ($\sigma_1$) may then be provided as output signal (y) of the machine learning system (60).

For determining the adapted parameters, the adaptation unit (62) may preferably adapt the parameters (Φ) of the neural network (61) based on a gradient descent method. The loss function for running the gradient descent method may comprise a loss term $$L_{conf}^\theta = \frac{1}{Y \cdot X} \sum_{i=1, j=1}^{Y, X} H(p_{i,j}),$$

wherein Y is a height of the semantic segmentation and/or instance segmentation characterized by the first intermediate output signal ($\sigma_1$), X is a width of the semantic segmentation and/or instance segmentation, H is the entropy function and $p_{i,j}$ is a classification comprised in the semantic segmentation and/or instance segmentation at location i,j. The gradient descent method may then be run for a predefined amount of iterations, wherein in each iteration a new first intermediate output signal ($\sigma_1$) is determined and the parameters (Φ) are updated accordingly. In further embodiments, adaption may also be run iteratively until the loss is equal to or less than a predefined threshold. After the gradient descent method is finished, the image (x) may be processed with the neural network (61) based on the adapted parameters and the first intermediate output signal ($\sigma_1$) may be provided as output signal (y) of the machine learning system (not shown). Instead of the entropy, the loss term may also comprise a hard likelihood ratio or a soft likelihood ratio of the classifications.

Preferably, the machine learning system (60) comprises a transformation function (g), which is configured to process the first intermediate output signal ($\sigma_1$) in order to determine a second intermediate output signal ($\sigma_2$). The transformation function (g) may especially characterize an edge-preserving smoothing filter, e.g., a bilateral filter. Preferably, the transformation function (g) preserves a width and a height of the first intermediate output signal ($\sigma_1$) in the second intermediate output signal ($\sigma_2$).

The first intermediate output signal ($\sigma_1$) and the second intermediate output signal ($\sigma_2$) may then be used as inputs to a cross-entropy loss term in the loss function. The cross entropy loss term may be characterized by the formula:

$$L_{conf}^{\theta} = \frac{1}{Y \cdot X} \sum_{i=1, j=1}^{Y, X} H(p_{i,j}, \bar{p}_{i,j}),$$

wherein $p_{i,j}$ characterizes a classification in the second intermediate output signal ($\sigma_2$) at position i,j and $\bar{p}_{i,j}$ characterizes a classification in the first intermediate output signal ($\sigma_1$) at position i,j. In further embodiments, the loss term may also comprise a hard likelihood ratio or a soft likelihood ratio of the corresponding classifications instead of the cross-entropy.

Preferably, the loss further comprises a loss term characterizing a deviation of the second intermediate output signal ($\sigma_2$) from a prior distribution of classifications. In embodiments where no second intermediate output signal ($\sigma_2$) is computed the deviation may also be determined between the first intermediate output signal ($\sigma_1$) and the prior distribution. The prior distribution may be determined based on label maps from a dataset, e.g., a training dataset of the neural network (61). For each label map a histogram of classifications may be determined. The histograms may optionally be normalized, e.g., L1-normalized. Afterwards, a model characterizing a probability density function may be fitted to the histograms, preferably a mixture model, e.g. a Gaussian mixture model or, in case no normalization is performed, a multinomial mixture model. An additional term $L_{clf}^{\theta}$ of the loss function may then characterize a cross-entropy between the prior distribution and the first intermediate output signal ($\sigma_1$) or the second intermediate output signal ($\sigma_2$) respectively.

The neural network (61) may optionally comprise a normalization layer (NL) for determining the first intermediate output signal ($\sigma_1$). The normalization layer (NL) may, for example be a GroupNorm layer, a BatchNorm layer, or a LayerNorm layer. If the neural network (61) comprises a normalization layer (NL) the loss may preferably further comprise a loss term $L_{adm}^{\theta}$ characterizing a deviation of an output of the normalization layer (NL) from a multivariate standard normal distribution. For example, if the normalization layer (NL) is a GroupNorm layer, the normalization layer (NL) normalizes each group in an input of the normalization layer (NL). The loss may then characterize a Kullback-Leibler divergence of parts of the output normalized by the normalization layer (NL). In the example of GroupNorm, a Kullback-Leibler divergence may be determined for each output of a normalized group and a multivariate standard normal distribution. The loss term $L_{adm}^{\theta}$ may then be determined according to an average of the respective Kullback-Leibler divergences.

It is also possible that the neural network (61) comprises a plurality of normalization layers (NL). In this case, the loss term may characterize a sum, preferably a weighted sum, of loss terms determined for each normalization layer (NL) individually.

The loss function may hence preferably be characterized by the formula:

$$L = L_{conf}^{\theta} + L_{clf}^{\theta} + L_{adm}^{\theta}.$$

Instead of a regular sum, the loss may also be determined according to a weighted sum of the respective terms. It is also possible that only one or two of the terms are used for adaptation.

Figure 2:
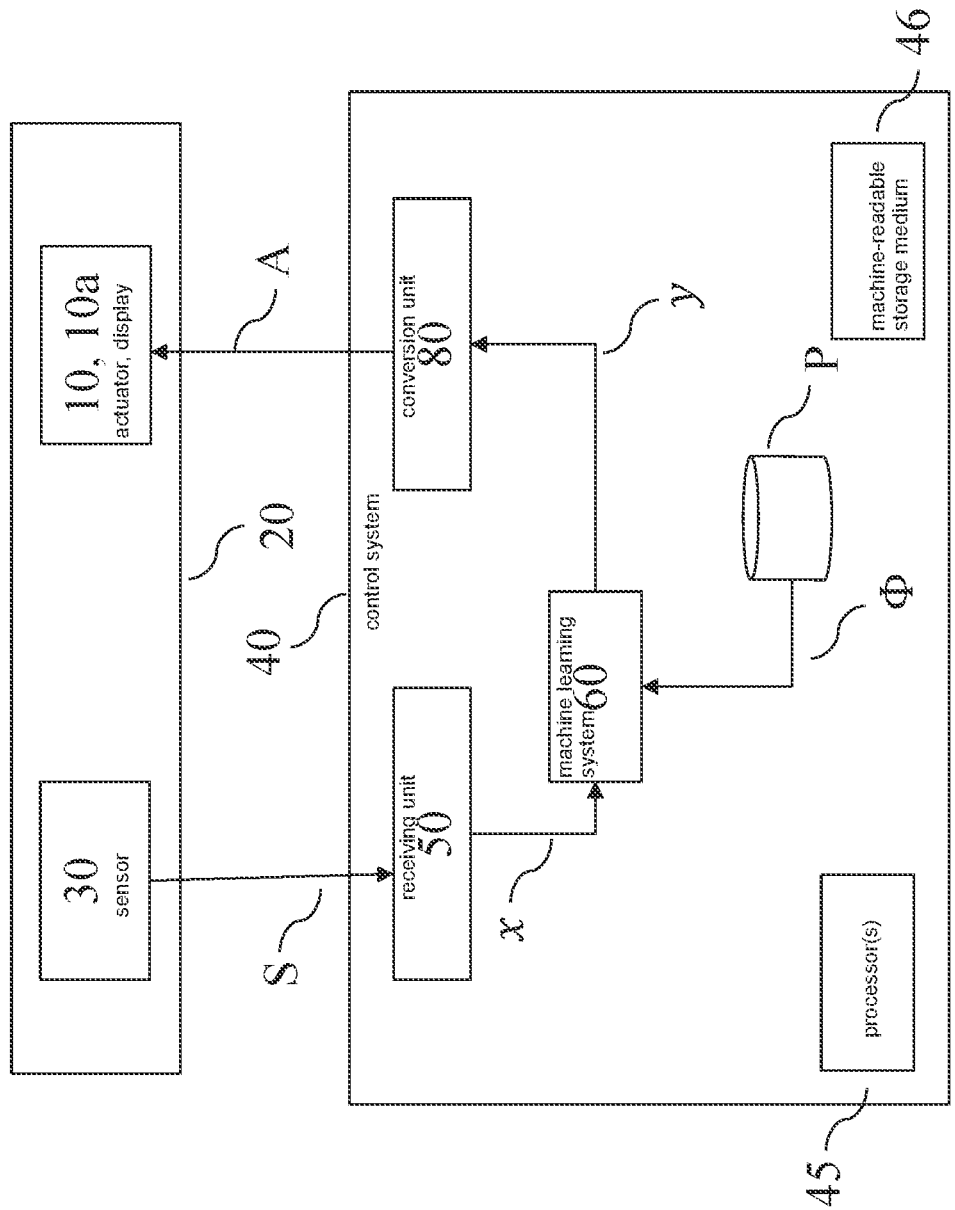
FIG. 2 shows a control system comprising a classifier controlling an actuator in its environment, according to an example embodiment of the present invention.

FIG. 2 shows an embodiment of a control system (40) controlling an actuator (10) in its environment (20) based on an output of the machine learning system (60). The actuator (10) interacts with the control system (40). The actuator (10) and its environment (20) will be jointly called actuator system. At preferably evenly spaced points in time, an optical sensor (30) senses a condition of the actuator system. The sensor (30) may comprise several sensors, e.g., a stereo camera. An output signal(S) of the sensor (30) (or, in case the sensor (30) comprises a plurality of sensors, an output signal(S) for each of the sensors) which encodes the sensed condition is transmitted to the control system (40).

Thereby, the control system (40) receives a stream of sensor signals(S). It then computes a series of control signals (A) depending on the stream of sensor signals(S), wherein the control signals (A) are then transmitted to the actuator (10).

The control system (40) receives the stream of sensor signals(S) of the sensor (30) in an optional receiving unit (50). The receiving unit (50) transforms the sensor signals (S) into input images (x). Alternatively, in case of no receiving unit (50), each sensor signal(S) may directly be taken as an input image (x). The input image (x) may, for example, be given as an excerpt from the sensor signal(S). Alternatively, the sensor signal(S) may be processed to yield the input image (x). In other words, the input image (x) is provided in accordance with the sensor signal(S).

The input image (x) is then passed on to the machine learning system (60).

The machine learning system (60) is parametrized by parameters (Φ), which are stored in and provided by a parameter storage ($St_1$).

The machine learning system (60) determines an output signal (y) from the input signals (x). The output signal (y) is transmitted to an optional conversion unit (80), which converts the output signal (y) into the control signals (A). The control signals (A) are then transmitted to the actuator (10) for controlling the actuator (10) accordingly. Alternatively, the output signal (y) may directly be taken as control signal (A).

The actuator (10) receives control signals (A), is controlled accordingly and carries out an action corresponding to the control signal (A). The actuator (10) may comprise a control logic which transforms the control signal (A) into a further control signal, which is then used to control actuator (10).

In further embodiments, the control system (40) may comprise the sensor (30). In even further embodiments, the control system (40) alternatively or additionally may comprise an actuator (10).

In still further embodiments, it can be envisioned that the control system (40) controls a display (10a) instead of or in addition to the actuator (10).

Furthermore, the control system (40) may comprise at least one processor (45) and at least one machine-readable storage medium (46) on which instructions are stored which, if carried out, cause the control system (40) to carry out a method according to an aspect of the present invention.

Figure 3:
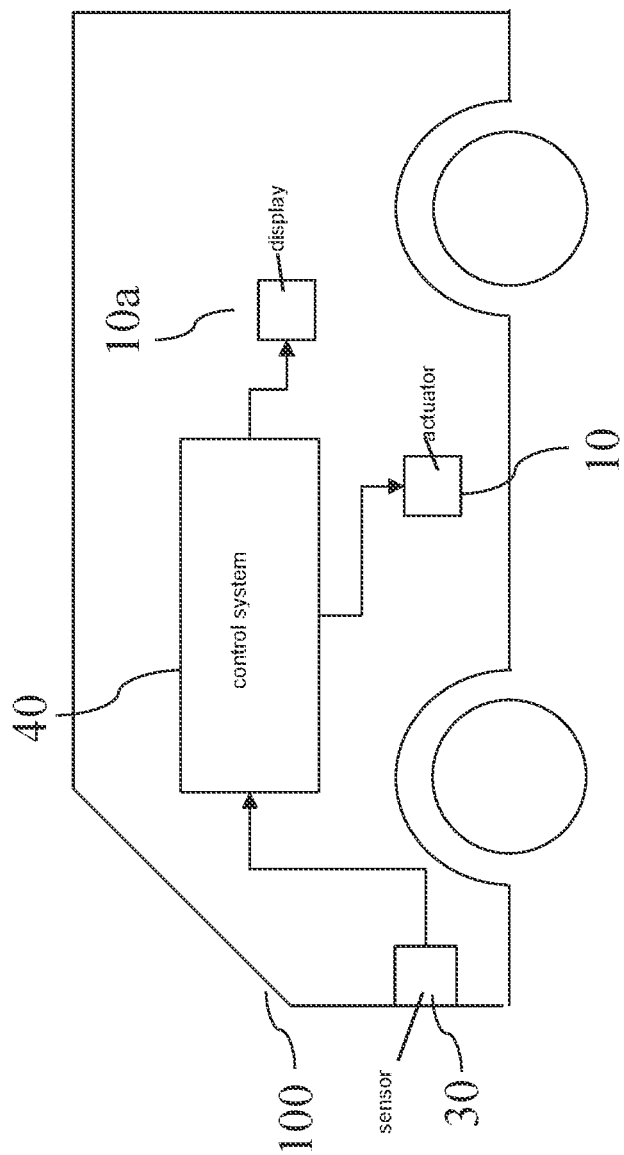
FIG. 3 shows the control system controlling an at least partially autonomous robot, according to an example embodiment of the present invention.

FIG. 3 shows an embodiment in which the control system (40) is used to control an at least partially autonomous robot, e.g., an at least partially autonomous vehicle (100).

The sensor (30) may comprise one or more video sensors and/or one or more radar sensors and/or one or more ultrasonic sensors and/or one or more LiDAR sensors. Some or all of these sensors are preferably but not necessarily integrated in the vehicle (100).

The input image (x) may hence display surroundings of the vehicle (100) and the output signal (y) may characterize a semantic segmentation and/or instance segmentation of the surroundings. The semantic segmentation and/or instance segmentation may especially characterize classifications of other road users, stationary elements such as buildings or signs, and roads or drivable grounds. The conversion unit (80) may then, e.g., determine a route such that the vehicle travels on ground classified as drivable by the output signal (y) while not colliding with other elements in the environment (20) of the vehicle (100). The control signal (A) may then be determined in accordance with this information.

The actuator (10), which is preferably integrated in the vehicle (100), may be given by a brake, a propulsion system, an engine, a drivetrain, or a steering of the vehicle (100).

Alternatively or additionally, the control signal (A) may also be used to control the display (10a), e.g., for displaying the objects detected by the machine learning system (60). It can also be imagined that the control signal (A) may control the display (10a) such that it produces a warning signal if the vehicle (100) is deviating from a save route through the environment as determined by the conversion unit (80). The warning signal may be a warning sound and/or a haptic signal, e.g., a vibration of a steering wheel of the vehicle.

In further embodiments, the at least partially autonomous robot may be given by another mobile robot (not shown), which may, for example, move by flying, swimming, diving, or stepping. The mobile robot may, inter alia, be an at least partially autonomous lawn mower, or an at least partially autonomous cleaning robot. In all of the above embodiments, the control signal (A) may be determined such that propulsion unit and/or steering and/or brake of the mobile robot are controlled such that the mobile robot may avoid collisions with said identified objects.

In a further embodiment, the at least partially autonomous robot may be given by a gardening robot (not shown), which uses the sensor (30), preferably an optical sensor, to determine a state of plants in the environment (20). The actuator (10) may control a nozzle for spraying liquids and/or a cutting device, e.g., a blade. Depending on an identified species and/or an identified state of the plants, a control signal (A) may be determined to cause the actuator (10) to spray the plants with a suitable quantity of suitable liquids and/or cut the plants.

In even further embodiments, the at least partially autonomous robot may be given by a domestic appliance (not shown), like e.g. a washing machine, a stove, an oven, a microwave, or a dishwasher. The sensor (30), e.g., an optical sensor, may detect a state of an object which is to undergo processing by the household appliance. For example, in the case of the domestic appliance being a washing machine, the sensor (30) may detect a state of the laundry inside the washing machine. The control signal (A) may then be determined depending on a detected material of the laundry.

Figure 4:
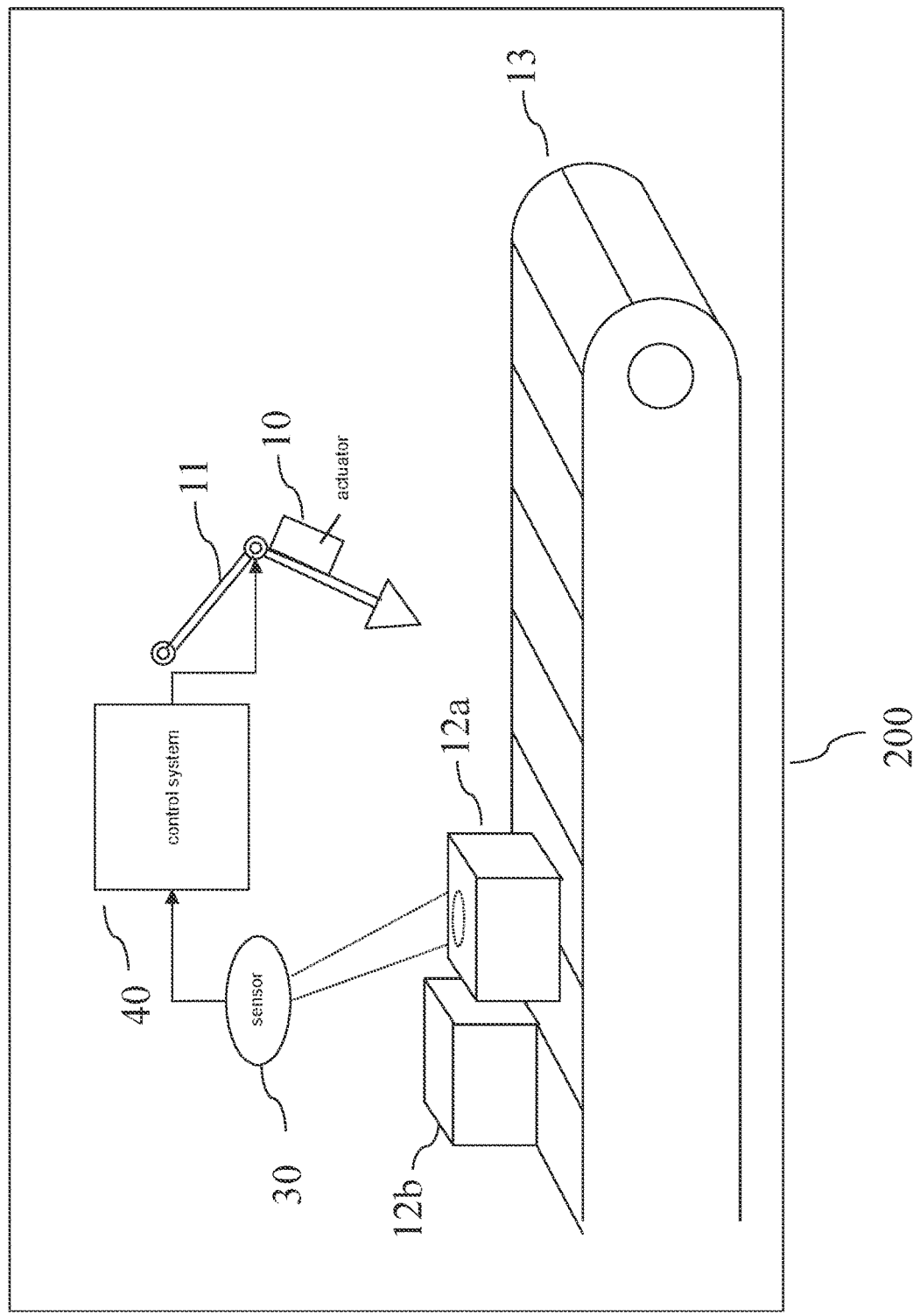
FIG. 4 shows the control system controlling a manufacturing machine, according to an example embodiment of the present invention.

FIG. 4 shows an embodiment in which the control system (40) is used to control a manufacturing machine (11), e.g., a punch cutter, a cutter, a gun drill or a gripper, of a manufacturing system (200), e.g., as part of a production line. The manufacturing machine (11) may comprise a transportation device, e.g., a conveyer belt or an assembly line, which moves a manufactured product (12). The control system (40) controls an actuator (10), which in turn controls the manufacturing machine (11).

The sensor (30) may be given by an optical sensor which captures properties of, e.g., a manufactured product (12).

The machine learning system (60) may performing an instance segmentation of the manufactured products (12) on the conveyer belt. The conversion unit (80) may then infer an exact position of the manufactured products (12) based on the instance segmentation. The actuator (10) may then be controlled depending on the determined position of the manufactured product (12) for a subsequent manufacturing step of the manufactured product (12). For example, the actuator (10) may be controlled to cut the manufactured product at a specific location of the manufactured product (12) itself.

FIG. 5 shows an embodiment of a medical imaging system (500) controlled by the control system (40). The imaging system may, for example, be an MRI apparatus, x-ray imaging apparatus or ultrasonic imaging apparatus. The sensor (30) may, for example, be an imaging sensor which takes at least one image of a patient, e.g., displaying different types of body tissue of the patient.

The machine learning system (60) may then determine a semantic segmentation of at least a part of the sensed image. The at least part of the image is hence used as input image (x) to the machine learning system (60).

The control signal (A) may then be chosen in accordance with the classification, thereby controlling a display (10a). For example, the machine learning system (60) may be configured to detect different types of tissue in the sensed image, e.g., by classifying the tissue displayed in the image into either malignant or benign tissue. This may be done by means of a semantic segmentation of the input image (x) by the machine learning system (60). The control signal (A) may then be determined to cause the display (10a) to display different tissues, e.g., by displaying the input image (x) and coloring different regions of identical tissue types in a same color.

In further embodiments (not shown) the imaging system (500) may be used for non-medical purposes, e.g., to determine material properties of a workpiece. In these embodiments, the machine learning system (60) may be configured to receive an input image (x) of at least a part of the workpiece and perform a semantic segmentation of the input image (x), thereby classifying the material properties of the workpiece. The control signal (A) may then be determined to cause the display (10a) to display the input image (x) as well as information about the detected material properties.

The term "computer" may be understood as covering any devices for the processing of pre-defined calculation rules. These calculation rules can be in the form of software, hardware or a mixture of software and hardware.

In general, a plurality can be understood to be indexed, that is, each element of the plurality is assigned a unique index, preferably by assigning consecutive integers to the elements contained in the plurality. Preferably, if a plurality comprises N elements, wherein N is the number of elements in the plurality, the elements are assigned the integers from 1 to N. It may also be understood that elements of the plurality can be accessed by their index.

What is claimed is:

1. A computer-implemented method for determining an output signal characterizing a semantic segmentation and/or an instance segmentation of an image, the method comprising the following steps:
   determining a first intermediate output signal from a machine learning system, the first intermediate output signal characterizing a semantic segmentation and/or an instance segmentation of the image;
   adapting parameters of the machine learning system based on a loss function, wherein the loss function characterizes an entropy or a cross-entropy of the first intermediate output signal; and
   determining the output signal from the machine learning system based on the image and the adapted parameters;
   wherein the loss function characterizes a mean entropy of classifications obtained for pixels of the image;
   wherein a second intermediate output signal is determined based on the first intermediate output signal by using a transformation function,
   wherein the second intermediate output signal characterizes a semantic segmentation and/or an instance segmentation of the image and the cross-entropy is determined based on the first intermediate output signal and the second intermediate output signal; and
   wherein the transformation function characterizes an edge-preserving smoothing filter.

2. The method according to claim 1, wherein the loss function further characterizes a likelihood of at least a part of the first intermediate output signal, wherein the likelihood is determined based on a density model of the at least part of the image.

3. The method according to claim 1, wherein the loss function further characterizes a log-likelihood, of at least a part of the first intermediate output signal, wherein the log-likelihood is determined based on a density model of the at least part of the image.

4. The method according to claim 2, wherein the likelihood characterizes an average likelihood of a plurality of patches, wherein the plurality of patches is determined based on the first intermediate output signal.

5. The method according to claim 4, wherein the likelihood of a patch of the patches is determined by determining a feature representation of the patch using a feature extractor and providing a likelihood of the feature representation as likelihood of the patch, wherein the likelihood of the feature representation is determined by the density model.

6. The method according to claim 2, wherein the density model is characterized by a mixture model, or a Gaussian mixture model, or a normal distribution.

7. The method according to claim 1, wherein for determining the output signal, the machine learning system includes a normalization transformation and the loss further characterizes a Kullback-Leibler divergence between an output of the normalization transformation and a predefined probability distribution.

8. The method according to claim 7, wherein the predefined probability distribution is characterized by a standard normal distribution.

9. The method according to claim 7, wherein the machine learning system includes a neural network for determining the output signal, wherein the neural network includes a normalization layer and wherein the loss further characterizes a Kullback-Leibler divergence between an output of the normalization layer and a predefined probability distribution.

10. A machine learning system configured to determine an output signal characterizing a semantic segmentation and/or an instance segmentation of an image, the machine learning system configured to:
    determine a first intermediate output signal from the machine learning system, the first intermediate output signal characterizing a semantic segmentation and/or an instance segmentation of the image;
    adapt parameters of the machine learning system based on a loss function, wherein the loss function characterizes an entropy or a cross-entropy of the first intermediate output signal; and
    determine the output signal from the machine learning system based on the image and the adapted parameters;
    wherein the loss function characterizes a mean entropy of classifications obtained for pixels of the image;
    wherein a second intermediate output signal is determined based on the first intermediate output signal by using a transformation function,
    wherein the second intermediate output signal characterizes a semantic segmentation and/or an instance segmentation of the image and the cross-entropy is determined based on the first intermediate output signal and the second intermediate output signal; and
    wherein the transformation function characterizes an edge-preserving smoothing filter.

11. A control system configured to determine a control signal, wherein the control signal is configured to control an actuator and/or a display, and wherein the control signal is determined based on an output signal determined by:
    determining a first intermediate output signal from a machine learning system, the first intermediate output signal characterizing a semantic segmentation and/or an instance segmentation of the image;
    adapting parameters of the machine learning system based on a loss function, wherein the loss function characterizes an entropy or a cross-entropy of the first intermediate output signal; and
    determining the output signal from the machine learning system based on the image and the adapted parameters;
    wherein the loss function characterizes a mean entropy of classifications obtained for pixels of the image;
    wherein a second intermediate output signal is determined based on the first intermediate output signal by using a transformation function,
    wherein the second intermediate output signal characterizes a semantic segmentation and/or an instance segmentation of the image and the cross-entropy is determined based on the first intermediate output signal and the second intermediate output signal; and
    wherein the transformation function characterizes an edge-preserving smoothing filter.

12. A non-transitory machine-readable storage medium on which is stored a computer program for determining an output signal characterizing a semantic segmentation and/or an instance segmentation of an image, the computer program, when executed by a computer, causing the computer to perform the following steps:
    determining a first intermediate output signal from a machine learning system, the first intermediate output signal characterizing a semantic segmentation and/or an instance segmentation of the image;
    adapting parameters of the machine learning system based on a loss function, wherein the loss function characterizes an entropy or a cross-entropy of the first intermediate output signal; and determining the output signal from the machine learning system based on the image and the adapted parameters;
wherein the loss function characterizes a mean entropy of classifications obtained for pixels of the image;
wherein a second intermediate output signal is determined based on the first intermediate output signal by using a transformation function,
wherein the second intermediate output signal characterizes a semantic segmentation and/or an instance segmentation of the image and the cross-entropy is determined based on the first intermediate output signal and the second intermediate output signal; and
wherein the transformation function characterizes an edge-preserving smoothing filter.

\* \* \* \* \*